United States Patent
Yang

(10) Patent No.: US 11,388,189 B2
(45) Date of Patent: Jul. 12, 2022

(54) METHOD FOR DETECTING BRUTE FORCE ATTACK AND RELATED APPARATUS

(71) Applicant: Huawei Technologies Co., Ltd., Shenzhen (CN)

(72) Inventor: Duo Yang, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 227 days.

(21) Appl. No.: 16/904,113

(22) Filed: Jun. 17, 2020

(65) Prior Publication Data
US 2020/0322378 A1     Oct. 8, 2020

Related U.S. Application Data

(63) Continuation of application No. PCT/CN2018/102881, filed on Aug. 29, 2018.

(30) Foreign Application Priority Data

Dec. 18, 2017     (CN) .......................... 201711365840.8

(51) Int. Cl.
| | | |
|---|---|---|
| *H04L 29/06* | (2006.01) | |
| *H04L 9/40* | (2022.01) | |
| *G06K 9/62* | (2022.01) | |

(52) U.S. Cl.
CPC ........ *H04L 63/1466* (2013.01); *G06K 9/6297* (2013.01); *H04L 63/0236* (2013.01);
(Continued)

(58) Field of Classification Search
CPC ............. H04L 63/1466; H04L 63/0236; H04L 63/1416; H04L 63/1425; H04L 63/1433; H04L 63/20; H04L 63/1408; G06K 9/6297
See application file for complete search history.

(56) References Cited

U.S. PATENT DOCUMENTS

| | | | | |
|---|---|---|---|---|
| 9,438,419 | B1 * | 9/2016 | Aggarwal | ............. H04L 9/0863 |
| 2007/0300300 | A1 * | 12/2007 | Guo | ..................... H04L 63/1441 726/23 |

(Continued)

FOREIGN PATENT DOCUMENTS

| | | |
|---|---|---|
| CN | 104052617 A | 9/2014 |
| CN | 105024885 A | 11/2015 |

(Continued)

OTHER PUBLICATIONS

Satoh, A., et al., "SSH Dictionary Attack Detection Based on Flow Analysis," XP032240390, 2012 IEEE/IPSJ 12th International Symposium on Applications and the Internet, Jul. 16, 2012, 9 pages.

(Continued)

*Primary Examiner* — John B King
(74) *Attorney, Agent, or Firm* — Conley Rose, P.C.

(57) ABSTRACT

A network device obtains to-be-detected mirrored traffic between a client and a server, obtains a first session information sequence based on the to-be-detected mirrored traffic, where the first session information sequence includes a plurality of pieces of session information, the plurality of pieces of session information have a one-to-one correspondence with a plurality of login sessions, and an arrangement order of the plurality of pieces of session information in the first session information sequence is consistent with a chronological order of the plurality of login sessions, using the first session information sequence as a first Markov chain, and obtains a state chain probability value of the first Markov chain, and determines, based on the state chain probability value of the first Markov chain and a first benchmark probability value, whether the plurality of login sessions are a brute force attack.

20 Claims, 10 Drawing Sheets

(52) U.S. Cl.
CPC ...... *H04L 63/1416* (2013.01); *H04L 63/1425* (2013.01); *H04L 63/1433* (2013.01); *H04L 63/20* (2013.01)

(56) References Cited

U.S. PATENT DOCUMENTS

| | | | |
|---|---|---|---|
| 2008/0127349 A1 | 5/2008 | Ormazabal et al. | |
| 2009/0126023 A1* | 5/2009 | Yun | G06F 21/577 |
| | | | 726/25 |
| 2011/0158470 A1* | 6/2011 | Martin | H04N 19/467 |
| | | | 382/100 |
| 2015/0101047 A1* | 4/2015 | Sridhara | H04L 63/1433 |
| | | | 726/23 |
| 2015/0161389 A1 | 6/2015 | Gregg | |
| 2016/0026184 A1* | 1/2016 | Stainvas Olshansky | |
| | | | G01S 17/89 |
| | | | 356/4.01 |
| 2017/0054738 A1* | 2/2017 | Avidan | G06F 16/951 |
| 2017/0169160 A1* | 6/2017 | Hu | G16B 40/00 |
| 2017/0230413 A1* | 8/2017 | Maresca | G06N 7/005 |
| 2017/0324757 A1* | 11/2017 | Al-Shaer | H04L 67/18 |
| 2018/0097826 A1* | 4/2018 | Luan | H04L 63/1416 |
| 2018/0136921 A1* | 5/2018 | Pfleger de Aguiar | G06Q 10/20 |

FOREIGN PATENT DOCUMENTS

| | | |
|---|---|---|
| CN | 106330949 A | 1/2017 |
| CN | 106936781 A | 7/2017 |
| CN | 107070852 A | 8/2017 |
| CN | 107204965 A | 9/2017 |
| CN | 107347047 A | 11/2017 |
| CN | 107402921 A | 11/2017 |
| CN | 107454043 A | 12/2017 |

OTHER PUBLICATIONS

Sperotto, A., et al., "Hidden Markov Model Modeling of SSH Brute-Force Attacks," XP047431056, Oct. 27, 2009, 13 pages.

* cited by examiner

| | | | | |
|---|---|---|---|---|
| 192.168.13.158 | 192.168.13.150 | SSH | 166 Client:Encrypted packet(len=100) | |
| 192.168.13.150 | 192.168.13.158 | TCP | 66 22 -> 36358 [ACK] Seq=1546 Ack=794 Win=30080 Len=0 Tsval=143579 Tsecr=144998 | |
| 192.168.13.150 | 192.168.13.158 | SSH | 150 Server:Encrypted packet(len=84) | |
| 192.168.13.158 | 192.168.13.150 | SSH | 166 Client:Encrypted packet(len=100) | |
| 192.168.13.150 | 192.168.13.158 | TCP | 66 22 -> 36358 [ACK] Seq=1630 Ack=894 Win=30080 Len=0 Tsval=143840 Tsecr=145251 | |
| 192.168.13.150 | 192.168.13.158 | SSH | 150 Server:Encrypted packet(len=84) | |
| 192.168.13.158 | 192.168.13.150 | SSH | 166 Client:Encrypted packet(len=100) | |
| 192.168.13.150 | 192.168.13.158 | TCP | 66 22 -> 36358 [ACK] Seq=1714 Ack=894 Win=30080 Len=0 Tsval=144082 Tsecr=145502 | |
| 192.168.13.150 | 192.168.13.158 | SSH | 150 Server:Encrypted packet(len=84) | |
| 192.168.13.158 | 192.168.13.150 | SSH | 166 Client:Encrypted packet(len=100) | |
| 192.168.13.150 | 192.168.13.158 | TCP | 66 22 -> 36358 [ACK] Seq=1798 Ack=1094 Win=30080 Len=0 Tsval=144344 Tsecr=145734 | |
| 192.168.13.150 | 192.168.13.158 | SSH | 150 Server:Encrypted packet(len=84) | |
| 192.168.13.158 | 192.168.13.150 | SSH | 166 Client:Encrypted packet(len=100) | |
| 192.168.13.150 | 192.168.13.158 | TCP | 66 22 -> 36358 [ACK] Seq=1882 Ack=1194 Win=30080 Len=0 Tsval=144526 Tsecr=146006 | |
| 192.168.13.150 | 192.168.13.158 | SSH | 150 Server:Encrypted packet(len=84) | |
| 192.168.13.158 | 192.168.13.150 | SSH | 166 Client:Encrypted packet(len=100) | |
| 192.168.13.150 | 192.168.13.158 | TCP | 66 22 -> 36358 [ACK] Seq=1966 Ack=1294 Win=30080 Len=0 Tsval=144817 Tsecr=146258 | |
| 192.168.13.150 | 192.168.13.158 | SSH | 150 Server:Encrypted packet(len=84) | |
| 192.168.13.158 | 192.168.13.150 | SSH | 166 Client:Encrypted packet(len=100) | |
| 192.168.13.150 | 192.168.13.158 | SSH | 150 Server:Encrypted packet(len=84) | |
| 192.168.13.158 | 192.168.13.150 | SSH | 166 Client:Encrypted packet(len=100) | |
| 192.168.13.150 | 192.168.13.158 | TCP | 66 22 -> 36358 [ACK] Seq=1966 Ack=1394 Win=30080 Len=0 Tsval=145195 Tsecr=146605 | |
| 192.168.13.150 | 192.168.13.158 | SSH | 150 Server:Encrypted packet(len=84) | |
| 192.168.13.158 | 192.168.13.150 | SSH | 166 Client:Encrypted packet(len=100) | |
| 192.168.13.150 | 192.168.13.158 | TCP | 66 22 -> 36356 [ACK] Seq=1546 Ack=794 Win=30080 Len=0 Tsval=143597 Tsecr=144997 | |
| 192.168.13.150 | 192.168.13.158 | SSH | 150 Server:Encrypted packet(len=36) | |

One login session

FIG. 4

| | | | |
|---|---|---|---|
| 192.168.13.158 | 192.168.13.150 | SSH | 166 Client: Encrypted packet (len=100) |
| 192.168.13.150 | 192.168.13.158 | TCP | 66 22 -> 36358 [ACK] Seq=1546 Ack=794 Win=30080 Len=0 Tsval=143579 Tsecr=144998 |
| 192.168.13.150 | 192.168.13.158 | SSH | 150 Server: Encrypted packet (len=84) |
| 192.168.13.158 | 192.168.13.150 | SSH | 166 Client: Encrypted packet (len=100) |
| 192.168.13.150 | 192.168.13.158 | TCP | 66 22 -> 36358 [ACK] Seq=1630 Ack=894 Win=30080 Len=0 Tsval=143840 Tsecr=145251 |
| 192.168.13.150 | 192.168.13.158 | SSH | 150 Server: Encrypted packet (len=84) |
| 192.168.13.158 | 192.168.13.150 | SSH | 166 Client: Encrypted packet (len=100) |
| 192.168.13.150 | 192.168.13.158 | TCP | 66 22 -> 36358 [ACK] Seq=1714 Ack=994 Win=30080 Len=0 Tsval=144092 Tsecr=145502 |
| 192.168.13.150 | 192.168.13.158 | SSH | 150 Server: Encrypted packet (len=84) |
| 192.168.13.158 | 192.168.13.150 | SSH | 166 Client: Encrypted packet (len=100) |
| 192.168.13.150 | 192.168.13.158 | TCP | 66 22 -> 36358 [ACK] Seq=1798 Ack=1094 Win=30080 Len=0 Tsval=144344 Tsecr=145754 |
| 192.168.13.150 | 192.168.13.158 | SSH | 150 Server: Encrypted packet (len=84) |
| 192.168.13.158 | 192.168.13.150 | SSH | 166 Client: Encrypted packet (len=100) |
| 192.168.13.150 | 192.168.13.158 | TCP | 66 22 -> 36358 [ACK] Seq=1882 Ack=1194 Win=30080 Len=0 Tsval=144596 Tsecr=146006 |
| 192.168.13.150 | 192.168.13.158 | SSH | 150 Server: Encrypted packet (len=84) |
| 192.168.13.158 | 192.168.13.150 | SSH | 166 Client: Encrypted packet (len=100) |
| 192.168.13.150 | 192.168.13.158 | TCP | 66 22 -> 36358 [ACK] Seq=1966 Ack=1294 Win=30080 Len=0 Tsval=144847 Tsecr=146258 |
| 192.168.13.150 | 192.168.13.158 | SSH | 150 Server: Encrypted packet (len=84) |
| 192.168.13.158 | 192.168.13.150 | SSH | 166 Client: Encrypted packet (len=100) |
| 192.168.13.150 | 192.168.13.158 | TCP | 66 22 -> 36358 [ACK] Seq=1966 Ack=1394 Win=30080 Len=0 Tsval=145195 Tsecr=146605 |
| 192.168.13.150 | 192.168.13.158 | SSH | 150 Server: Encrypted packet (len=84) |

FIG. 6

| | | | | |
|---|---|---|---|---|
| 192.168.13.158 | 192.168.13.150 | SSH | 166 | Client:Encrypted packet(len=100) |
| 192.168.13.150 | 192.168.13.158 | TCP | 66 | 22 -> 36356[ACK] Seq=1546 Ack=794 Win=30080 Len=0 Tsval=143597 Tsecr=144997 |
| 192.168.13.150 | 192.168.13.158 | SSH | 150 | Server:Encrypted packet(len=84) |
| 192.168.13.158 | 192.168.13.150 | SSH | 166 | Client:Encrypted packet(len=100) |
| 192.168.13.150 | 192.168.13.158 | TCP | 66 | 22 -> 36356[ACK] Seq=1630 Ack=894 Win=30080 Len=0 Tsval=143838 Tsecr=145249 |
| 192.168.13.150 | 192.168.13.158 | SSH | 150 | Server:Encrypted packet(len=84) |
| 192.168.13.158 | 192.168.13.150 | SSH | 166 | Client:Encrypted packet(len=100) |
| 192.168.13.150 | 192.168.13.158 | TCP | 66 | 22 -> 36356[ACK] Seq=1714 Ack=994 Win=30080 Len=0 Tsval=144090 Tsecr=145500 |
| 192.168.13.150 | 192.168.13.158 | SSH | 150 | Server:Encrypted packet(len=84) |
| 192.168.13.158 | 192.168.13.150 | SSH | 166 | Client:Encrypted packet(len=100) |
| 192.168.13.150 | 192.168.13.158 | TCP | 66 | 22 -> 36356[ACK] Seq=1798 Ack=1094 Win=30080 Len=0 Tsval=144342 Tsecr=145752 |
| 192.168.13.150 | 192.168.13.158 | SSH | 150 | Server:Encrypted packet(len=84) |
| 192.168.13.158 | 192.168.13.150 | SSH | 166 | Client:Encrypted packet(len=100) |
| 192.168.13.150 | 192.168.13.158 | TCP | 66 | 22 -> 36356[ACK] Seq=1882 Ack=1194 Win=30080 Len=0 Tsval=144594 Tsecr=145004 |
| 192.168.13.150 | 192.168.13.158 | SSH | 150 | Server:Encrypted packet(len=84) |
| 192.168.13.158 | 192.168.13.150 | SSH | 166 | Client:Encrypted packet(len=100) |
| 192.168.13.150 | 192.168.13.158 | TCP | 66 | 22 -> 36356[ACK] Seq=1966 Ack=1294 Win=30080 Len=0 Tsval=144845 Tsecr=146256 |
| 192.168.13.150 | 192.168.13.158 | SSH | 150 | Server:Encrypted packet(len=84) |

FIG. 7

| | | | |
|---|---|---|---|
| 192.168.13.158 | 192.168.13.150 | SSH | 166 Client:Encrypted packet(len=100) |
| 192.168.13.150 | 192.168.13.158 | TCP | 66 22 -> 36360[ACK] Seq=1546 Ack=794 Win=30080 Len=0 Tsval=143592 Tsecr=144992 |
| 192.168.13.150 | 192.168.13.158 | SSH | 150 Server:Encrypted packet(len=84) |
| 192.168.13.158 | 192.168.13.150 | SSH | 166 Client:Encrypted packet(len=100) |
| 192.168.13.150 | 192.168.13.158 | TCP | 66 22 -> 36360[ACK] Seq=1630 Ack=894 Win=30080 Len=0 Tsval=143833 Tsecr=145244 |
| 192.168.13.150 | 192.168.13.158 | SSH | 150 Server:Encrypted packet(len=84) |
| 192.168.13.158 | 192.168.13.150 | SSH | 166 Client:Encrypted packet(len=100) |
| 192.168.13.150 | 192.168.13.158 | TCP | 66 22 -> 36360[ACK] Seq=1714 Ack=994 Win=30080 Len=0 Tsval=144084 Tsecr=145549 |
| 192.168.13.150 | 192.168.13.158 | SSH | 150 Server:Encrypted packet(len=84) |
| 192.168.13.158 | 192.168.13.150 | SSH | 166 Client:Encrypted packet(len=100) |
| 192.168.13.150 | 192.168.13.158 | TCP | 66 22 -> 36360[ACK] Seq=1798 Ack=1094 Win=30080 Len=0 Tsval=144336 Tsecr=145746 |
| 192.168.13.150 | 192.168.13.158 | SSH | 150 Server:Encrypted packet(len=84) |
| 192.168.13.158 | 192.168.13.150 | SSH | 166 Client:Encrypted packet(len=100) |
| 192.168.13.150 | 192.168.13.158 | TCP | 66 22 -> 36360[ACK] Seq=1882 Ack=1194 Win=30080 Len=0 Tsval=144587 Tsecr=145998 |
| 192.168.13.150 | 192.168.13.158 | SSH | 150 Server:Encrypted packet(len=84) |
| 192.168.13.158 | 192.168.13.150 | SSH | 166 Client:Encrypted packet(len=100) |
| 192.168.13.150 | 192.168.13.158 | TCP | 66 22 -> 36360[ACK] Seq=1966 Ack=1294 Win=30080 Len=0 Tsval=144839 Tsecr=145250 |
| 192.168.13.150 | 192.168.13.158 | SSH | 150 Server:Encrypted packet(len=84) |
| 192.168.13.158 | 192.168.13.150 | SSH | 166 Client:Encrypted packet(len=100) |
| 192.168.13.150 | 192.168.13.158 | TCP | 66 22 -> 36360[ACK] Seq=2050 Ack=1394 Win=30080 Len=0 Tsval=145091 Tsecr=146501 |
| 192.168.13.150 | 192.168.13.158 | SSH | 150 Server:Encrypted packet(len=84) |

FIG. 8

METHOD FOR DETECTING BRUTE FORCE ATTACK AND RELATED APPARATUS

CROSS-REFERENCE TO RELATED APPLICATIONS

This application is a continuation of International Patent Application No. PCT/CN2018/102881, filed on Aug. 29, 2018, which claims priority to Chinese Patent Application No. 201711365840.8, filed on Dec. 18, 2017. The disclosures of the aforementioned applications are hereby incorporated by reference in their entireties.

TECHNICAL FIELD

This application relates to the computer field, and more specifically, to a method for detecting a brute force attack, a network device, and a computer-readable storage medium.

BACKGROUND

In a cloud computing environment, cloud servers exposed in a public network environment are faced with a large quantity of attacks every day. A password brute force attack on application services deployed on the cloud server is the most common one.

The brute force attack means that an attacker performs exhaustive scanning on passwords of these application services. If a strength of a password configured by a user is weak, the password is easy to be hit by a password dictionary of the attacker. In other words, the passwords of these application services are easy to be cracked.

If the passwords of the application services are cracked, the attacker may illegally access the application services, causing leakage of user data and even control on an application server by the attacker. Therefore, detecting the brute force attack is very necessary for security of the cloud server.

SUMMARY

This application provides a method for detecting a brute force attack and a related apparatus, to help detect a brute force attack.

According to a first aspect, this application provides a method for detecting a brute force attack. The detection method includes obtaining, by a network device, to-be-detected mirrored traffic between a client and a server, obtaining, by the network device, a first session information sequence based on the to-be-detected mirrored traffic, where the first session information sequence includes a plurality of pieces of session information, the plurality of pieces of session information have a one-to-one correspondence with a plurality of login sessions that are initiated by the client to the server using the to-be-detected mirrored traffic, and an arrangement order of the plurality of pieces of session information in the first session information sequence is consistent with a chronological order of the plurality of login sessions, using, by the network device, the first session information sequence as a first Markov chain, and obtaining a state chain probability value of the first Markov chain, where each piece of session information in the first session information sequence is used as a state in the first Markov chain, and determining, by the network device based on the state chain probability value of the first Markov chain and a first benchmark probability value, whether the plurality of login sessions are a brute force attack, where the first benchmark probability value is used to identify the brute force attack.

In this detection method, the plurality of pieces of session information of the plurality of login sessions are considered as a Markov chain, a state chain probability value of the Markov chain is calculated, and whether the plurality of login sessions are the brute force attack is determined based on the state chain probability value. That is, in this detection method, a problem of determining the brute force attack is converted into a probability problem, and whether the login sessions are the brute force attack is determined based on a probability, thereby helping detect the brute force attack.

In a possible design, each piece of session information is a sum of a length of a packet carrying a user name and a password and a length of a packet carrying an authentication result, and the packets are in a corresponding login session.

In a possible design, the determining, by the network device based on the state chain probability value of the first Markov chain and a first benchmark probability value, whether the plurality of login sessions are a brute force attack includes, if the state chain probability value of the first Markov chain is less than or equal to the first benchmark probability value, determining, by the network device, that the plurality of login sessions are the brute force attack, or if a difference between the state chain probability value of the first Markov chain and the first benchmark probability value is less than or equal to a preconfigured threshold, determining, by the network device, that the plurality of login sessions are the brute force attack.

In a possible design, the state chain probability value of the first Markov chain is determined based on an initial probability value of the first Markov chain and a transition probability value of the first Markov chain.

Before the obtaining, by a network device, to-be-detected mirrored traffic between a client and a server, the detection method further includes obtaining, by the network device, historical mirrored traffic between the client and the server, obtaining, by the network device, a second session information sequence based on the historical mirrored traffic, where the second session information sequence includes a plurality of pieces of historical session information, the plurality of pieces of historical session information have a one-to-one correspondence with a plurality of historical login sessions that are initiated by the client to the server using the historical mirrored traffic, an arrangement order of the plurality of pieces of historical session information in the second session information sequence is consistent with a chronological order of the plurality of historical login sessions, and the plurality of historical login sessions are a brute force attack, and using, by the network device, the second session information sequence as a second Markov chain, and obtaining an initial probability value of the second Markov chain and a transition probability value of the second Markov chain, where each piece of historical session information in the second session information sequence is used as a state in the second Markov chain.

The network device determines that the initial probability value of the first Markov chain is the initial probability value of the second Markov chain, and the transition probability value of the first Markov chain is the transition probability value of the second Markov chain.

In this design, the initial probability value and the transition probability value of the second Markov chain are obtained based on the historical mirrored traffic, and then the initial probability value and the transition probability value of the first Markov chain are determined based on the initial probability and the transition probability of the second Markov chain. This helps improve accuracy of the initial probability and the transition probability of the first Markov chain, and further helps improve accuracy of detecting the brute force attack.

In a possible design, before the obtaining, by a network device, to-be-detected mirrored traffic between a client and a server, the detection method further includes obtaining, by the network device, a state chain probability value of the second Markov chain, and determining, by the network device, the first benchmark probability value based on the state chain probability value of the second Markov chain.

In this design, the first benchmark probability value may be obtained using the transition probability value of the second Markov chain. This helps improve accuracy of the state chain probability value, and further helps improve accuracy of detecting the brute force attack.

In a possible design, the determining, by the network device, the first benchmark probability value based on the state chain probability value of the second Markov chain includes using, by the network device, the state chain probability value of the second Markov chain as the first benchmark probability value.

In a possible design, when the network device determines that the plurality of login sessions are the brute force attack based on the state chain probability value of the first Markov chain and the first benchmark probability value, the detection method further includes determining, by the network device based on a second benchmark probability value and the state chain probability value of the first Markov chain, whether the brute force attack initiated by the plurality of login sessions succeeds, where the second benchmark probability value is used to identify a brute force attack that succeeds.

In a possible design, the second benchmark probability value is determined based on a state chain probability value of a third Markov chain when a third session information sequence is used as the third Markov chain, where the third session information sequence includes a plurality of pieces of historical session information, the plurality of pieces of historical session information included in the third session information sequence have a one-to-one correspondence with the plurality of historical login sessions between the client and the server, the plurality of historical login sessions corresponding to the plurality of pieces of historical session information included in the third session information sequence are a brute force attack that succeeds, each piece of historical session information in the third session information sequence is used as a state in the third Markov chain, and an arrangement order of the plurality of pieces of historical session information included in the third session information sequence in the third session information sequence is consistent with a chronological order of the plurality of historical login sessions corresponding to the plurality of pieces of historical session information included in the third session information sequence.

According to a second aspect, this application provides a network device. The network device has a function of implementing the foregoing detection method or design. The function may be implemented by hardware, or may be implemented by hardware executing corresponding software. The hardware or the software includes one or more modules corresponding to the foregoing function, for example, a processor, a communications interface, and a memory. The memory stores a related instruction, the communications interface performs data transmission with another network device, and the processor executes the instruction in the memory, to complete the steps in the detection method or design.

According to a third aspect, this application provides a computer-readable storage medium. The computer-readable storage medium stores program code to be executed by a network device. The program code includes an instruction used to perform the detection method in any one of the first aspect or the designs of the first aspect.

According to a fourth aspect, this application provides a computer program product that includes an instruction. When the computer program product is run on a network device, the network device is enabled to perform the detection method in any one of the first aspect or the designs of the first aspect.

According to a fifth aspect, this application provides a system chip. The system chip includes an input/output interface, at least one processor, at least one memory, and a bus. The at least one memory is configured to store an instruction, and the at least one processor is configured to invoke the instruction in the at least one memory, to perform the operations of the detection method in any one of the first aspect or the designs of the first aspect.

BRIEF DESCRIPTION OF DRAWINGS

FIG. 4 is a schematic diagram of mirrored traffic according to an embodiment of this application.

FIG. 6 is a schematic diagram of mirrored traffic according to an embodiment of this application.

FIG. 7 is a schematic diagram of mirrored traffic according to an embodiment of this application.

FIG. 8 is a schematic diagram of mirrored traffic according to an embodiment of this application.

DESCRIPTION OF EMBODIMENTS

The following describes the technical solutions in this application with reference to the accompanying drawings.

Figure 1:
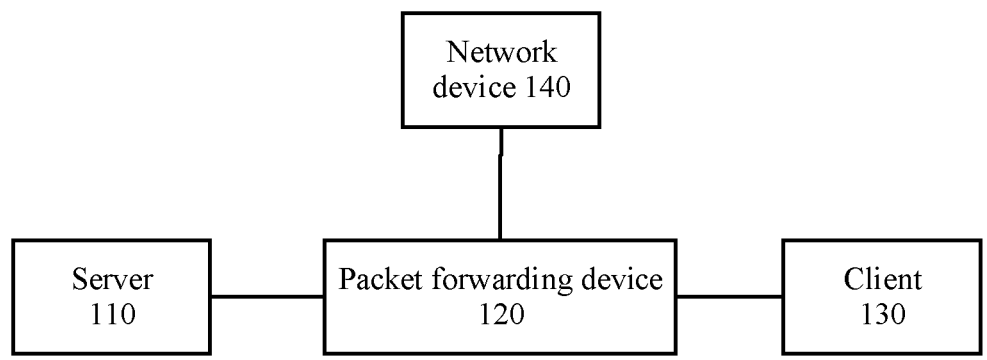
FIG. 1 is a schematic architectural diagram of a network system to which a detection method according to an embodiment of this application is applied.

FIG. 1 is a schematic architectural diagram of a network system to which a method for detecting a brute force attack according to an embodiment of this application is applied. It should be understood that the embodiments of this application are not limited to the system architecture shown in FIG. 1. In addition, a device in FIG. 1 may be hardware, may be software obtained through function division, or may be a combination thereof.

The network system shown in FIG. 1 may include a server 110, a packet forwarding device 120, and a client 130.

The server 110 may be various application servers, for example, a web server, a File Transfer Protocol (FTP) server, a game server, and an e-commerce server. The client 130 may be various application clients implemented by software, for example, a browser and a game client. The packet forwarding device 120 may be a network device having a packet forwarding function, for example, a switch, a firewall, or a router. An application service provider provides an application service for a user using a packet transmitted between the server 110 and the client 130. The packet transmitted between the server 110 and the client 130 is forwarded by the packet forwarding device 120.

It should be understood that a quantity of servers 110, a quantity of packet forwarding devices 120, and a quantity of clients 130 shown in FIG. 1 are merely used as an example. The quantity of servers 110, the quantity of packet forwarding devices 120, and the quantity of clients 130 in the network system are not limited in this embodiment of this application.

For structures of the server 110, the packet forwarding device 120, and the client 130, refer to structures of a server, a packet forwarding device, and a client in other approaches. Details are not described herein again.

Before a packet that carries service data starts to be transmitted between the server 110 and the client 130, the client 130 needs to complete a login process first. The login process includes the following basic steps. The client 130 sends an authentication request packet to the server 110, where the authentication request packet carries a user name and a password. After receiving the authentication request packet from the client 130, the server 110 compares the password in the authentication request packet with a password corresponding to a user name stored in a database. If the password in the authentication request packet and the password corresponding to the user name stored in the database are consistent, the authentication succeeds. If the password in the authentication request packet and the password corresponding to the user name stored in the database are inconsistent, the authentication fails, and then the authentication is completed. After performing authentication on the user name and the password, the server 110 may send an authentication response packet to the client 130, where the authentication response packet indicates an authentication result, and the authentication result is that the authentication succeeds or the authentication fails.

If the server 110 has authenticated the user name and the password, the server 110 may provide a service for the client 130. In this case, it may be considered that the client 130 successfully performs login.

If the server 110 fails to authenticate the user name and the password, the server 110 refuses to provide a service for the client 130. In this case, it may be considered that the client 130 fails to perform login.

A packet exchange process in which the client 130 sends the authentication request packet to the server 110 and the server 110 returns the corresponding authentication response packet to the client 130 may be referred to as a login session.

A protocol carrying an authentication request and an authentication response may be referred to as an authentication protocol of a login session. An example of the authentication protocol of the login session is a secure shell (SSH) protocol. The SSH protects a user name and a password that are transmitted in a login process using an encryption channel, to improve security of the login process and prevent a user name and a password that are transmitted in a plain text manner from being illegally intercepted. However, on the other hand, use of the encryption channel increases difficulty in identifying a brute force attack.

In this application, for brevity, an address of the client 130 may be referred to as a source address of the login session, that is, a source address from which the client 130 sends the authentication request packet to the server 110. A port through which the client 130 sends the authentication request packet to the server 110 may be referred to as a source port of the login session. An address of the server 110 may be referred to as a destination address of the login session, and a port that is on the server 110 and through which the server 110 receives the authentication request packet and sends the authentication response packet may be referred to as a destination port of the login session.

For example, an example of the source address of the login session is an Internet Protocol (IP) address of the client 130, and an example of the destination address of the login session is an IP address of the server 110.

When implementing a brute force attack, the client 130, as an attacker, may initiate a plurality of login sessions to the server 110 by exhaustively testing user passwords, to log in to the server 110.

In all login sessions that are initiated by the client 130 to the server 110 within a time period, login sessions with a same source address, destination address, destination port, and authentication protocol may be referred to as an attack event. The attack event may include one or more attack processes. Login sessions included in each attack process are login sessions with a same source port in the login sessions included in the attack event. In other words, the login sessions included in each attack process have a same quintuple. Each attack process may also be referred to as a brute force attack.

If the client 130 succeeds in logging in to the server 110 after the client 130 initiates a brute force attack to the server 110, the brute force attack may be referred to as a brute force attack that succeeds.

This application provides a method for detecting a brute force attack and a method for detecting whether a brute force attack succeeds. The detection method may be performed by the network device 140 in FIG. 1. A schematic structure of the network device 140 is shown in FIG. 2.

Figure 2:
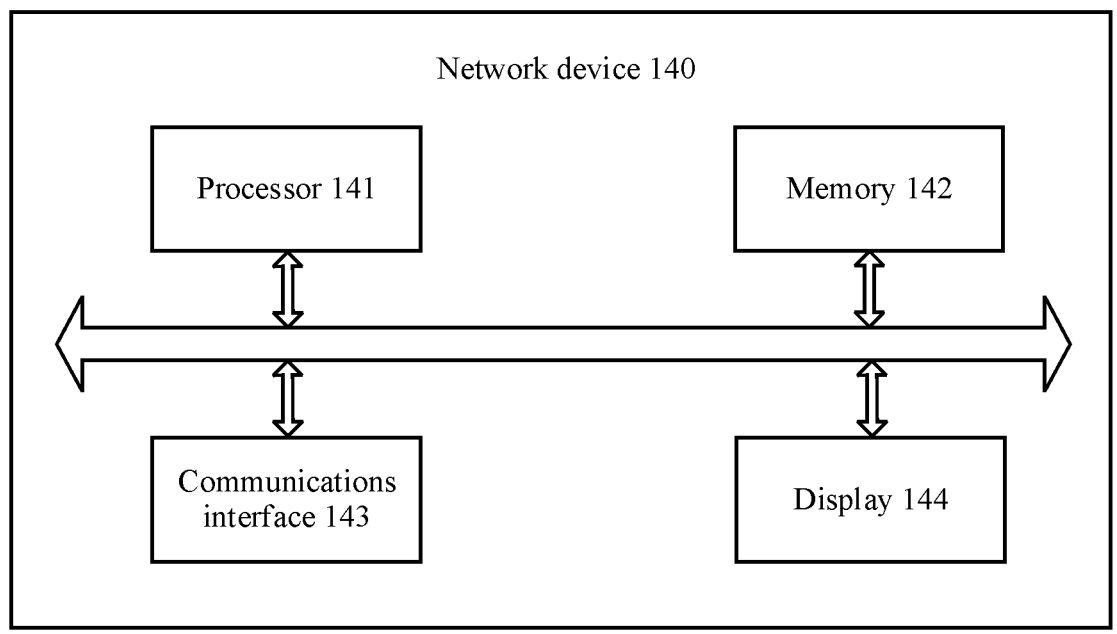
FIG. 2 is a schematic structural diagram of a network device according to an embodiment of this application.

As shown in FIG. 2, the network device 140 may include a processor 141, a memory 142, and a communications interface 143. The communications interface 143 may be configured to obtain mirrored traffic between the client 130 and the server 110 from the packet forwarding device 120. The memory 142 may be configured to store program code executed by the processor 141, the mirrored traffic obtained from the packet forwarding device, a detection result, and the like. The processor 141 is configured to execute the program code stored in the memory 142, detect a brute force attack based on information such as the mirrored traffic stored in the memory 142, and even detect whether the brute force attack succeeds.

Optionally, the network device 140 may further include a display 144. The display 144 is configured to display related information in a process in which the processor 141 detects the brute force attack. For example, the display 144 may display whether a login session between the client 130 and the server 110 is a brute force attack.

A main idea of the detection method provided in this application may include. Session information of each login session is used as a state in a Markov chain, a plurality of pieces of session information corresponding to a plurality of login sessions are sorted based on a chronological order of the plurality of login sessions, a sorted session information sequence is used as the Markov chain, a state chain probability value of the Markov chain is calculated, and whether the plurality of login sessions are a brute force attack is determined based on the state chain probability value.

In this embodiment of this application, session information used to describe a login session is information that may be quantized or may be numeralized in traffic generated when the login session is performed. For example, the session information of the login session may be a sum of lengths of a plurality of packets in the login session. One type of packet included in the plurality of packets may be a packet that is sent by the client and that carries a user name and a password, for example, an authentication request packet. Another type of packet may be a packet that is sent by the server and that carries an authentication result, for example, an authentication response packet. For another example, frequency, a time interval, or the like of information exchange in the login session may be used as the session information of the login session.

Figure 3:
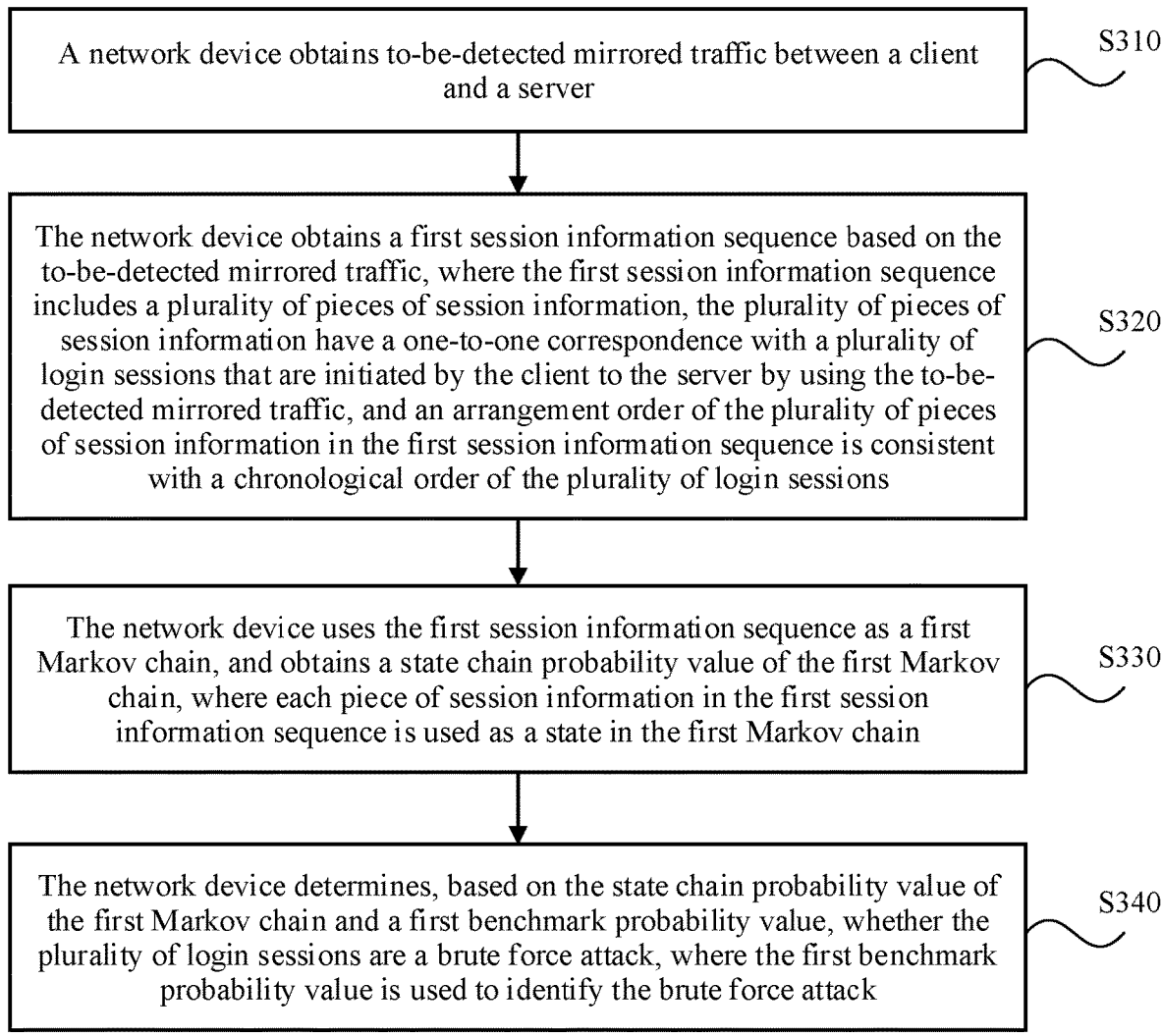
FIG. 3 is a schematic flowchart of a detection method according to an embodiment of this application.

FIG. 3 is a schematic flowchart of a method for detecting a brute force attack according to an embodiment of this application. It should be understood that FIG. 3 shows steps or operations of the detection method. However, these steps or operations are merely used as an example. Other operations or variants of the operations in FIG. 3 may alternatively be performed in this embodiment of this application.

The detection method shown in FIG. 3 may include S310, S320, and S330. The detection method shown in FIG. 3 may be performed by a network device 140.

S310. The network device obtains to-be-detected mirrored traffic between a client and a server.

For example, the network device obtains, based on an IP address of the server 110 and a port number of an open application service, total mirrored traffic related to a designated port of the server in a time period from a packet forwarding device 120 using a port mirroring function of the packet forwarding device. Then, the network device obtains address information of a peer device that exchanges a packet with the foregoing port of the server, where the address information includes an IP address and a port number. Address information of each peer device is used as address information of the client, and to-be-detected mirrored traffic between the client and the server is filtered out from the total mirrored traffic based on a quintuple (that is, a source address, a destination address, a source port, a destination port, and an authentication protocol).

S320. The network device obtains a first session information sequence based on the to-be-detected mirrored traffic, where the first session information sequence includes a plurality of pieces of session information. The plurality of pieces of session information in the first session information sequence have a one-to-one correspondence with a plurality of login sessions that are initiated by the client to the server using the to-be-detected mirrored traffic. An arrangement order of the plurality of pieces of session information in the first session information sequence is consistent with a chronological order of the plurality of login sessions.

An implementation in which the network device obtains the first session information sequence based on the to-be-detected mirrored traffic is as follows.

The network device sequentially obtains, from the to-be-detected mirrored traffic in a chronological order of the login sessions, session information of each login session that is initiated by the client 130 to the server 110.

If the client 130 initiates the plurality of login sessions to the server 110 using the to-be-detected mirrored traffic, the network device may obtain the plurality of pieces of session information from the to-be-detected mirrored traffic. A quantity of the pieces of the session information is the same as a quantity of the login sessions, and the plurality of pieces of session information have a one-to-one correspondence with the plurality of login sessions.

Because the network device obtains the corresponding session information based on the chronological order of the login sessions, the arrangement order of the plurality of pieces of session information obtained by the network device is consistent with the chronological order of the plurality of login sessions. The plurality of pieces of session information obtained in the foregoing manner are sorted, to generate the first session information sequence.

The foregoing implementation of obtaining the first session information sequence is merely an example. In this embodiment of this application, the first session information sequence may alternatively be obtained in another manner. For example, after obtaining the plurality of pieces of session information from the to-be-detected mirrored traffic, the network device sorts the plurality of pieces of session information based on the chronological order of the plurality of login sessions, to obtain the first session information sequence. The plurality of login sessions have a one-to-one correspondence with the plurality of pieces of session information, and the arrangement order of the plurality of pieces of session information in the first session information sequence is the same as the chronological order of the plurality of login sessions.

FIG. 4 is a schematic diagram of mirrored traffic including packets related to a plurality of login sessions according to an embodiment of this application. The mirrored traffic shown in FIG. 4 includes 24 rows of information, and the 24 rows of information is sorted according to a chronological order of information generation. Each row of information indicates a packet exchanged between a client and a server, the first column is an IP address of a packet transmit end, the second column is an IP address of a packet receive end, the third column is a protocol name of a packet, and the fourth column is some information obtained by parsing a packet header. The information includes a source port number, a destination port number, a packet type identifier, a packet sequence number, a packet length, a timestamp value (TSval), a timestamp echo reply field (TSecr), and the like.

As shown in FIG. 4, one login session includes three consecutive packet exchanges. The first packet exchange in the login session is that the client sends an authentication request packet to the server, where the authentication request packet may include a user name and a password. The second packet exchange in the login session is that the server sends an acknowledgment packet to the client, where the acknowledgment packet is used to indicate that the server has received the user name and the password. The third packet exchange in the login session is that the server sends an authentication response packet to the client, to notify the client that the authentication succeeds or the authentication fails.

Based on the mirrored traffic shown in FIG. 4, the client initiates eight login sessions to the server. A source address of each login session is an IP address of the client: "192.168.13.158", a destination address is an IP address of the server end: "192.168.13.150", a source port is a port of the client: "36358", a destination port is "22", and an authentication protocol is "SSH".

Source addresses, destination addresses, source ports, destination ports, and authentication protocols of the eight login sessions are the same. Therefore, session information of each login session may be obtained sequentially, to obtain a first session information sequence.

In each login session, if a sum of a length of an authentication request packet (that is, a value 100 in brackets of the first row of information) and a length of an authentication response packet (that is, a value 84 in brackets of the third row of information) is used as session information of the login session, a first session information sequence including eight pieces of session information corresponding to the eight login sessions is 184-184-184-184-184-184-184-136.

S330. The network device uses the first session information sequence as a first Markov chain, and obtains a state chain probability value of the first Markov chain, where each piece of session information in the first session information sequence is used as a state in the first Markov chain.

After using the first session information sequence as the first Markov chain, the network device may obtain the state chain probability value of the first Markov chain based on an initial probability value and a transition probability value of the first Markov chain.

Before S330 is performed, the network device may store the initial probability value and the transition probability value of the first Markov chain.

A length of the first Markov chain is represented by $n_1$, the initial probability value of the first Markov chain is represented by $p_0$, and a probability value of transition from an $i^{th}$ state to an $(i+1)^{th}$ state in the first Markov chain is represented by $p_{ij}$. In this case, the state chain probability value $p$ of the first Markov chain may be calculated using a formula $p=p_0*\Pi p_{ij}$, where "$\Pi$" represents a product, $n_1$ is a positive integer, and $i$ is a positive integer less than $n_1$.

For example, each piece of session information is used as a state, and the first session information sequence "184-184-184-184-184-184-184-136" obtained in S320 is used as the first Markov chain. In this case, an initial state in the first Markov chain is 184, the first Markov chain includes seven times of state transition, 184 transits to 184 in the first six times, and 184 transits to 136 in the seventh time.

If an initial probability value of 184 that is stored in the network device is $1/20$, a probability value of transition from 184 to 184 is $19/20$, and a probability value of transition from 184 to 136 is $1/20$, based on the foregoing formula for calculating the state chain probability value, the state chain probability value of the first Markov chain may be calculated as $$\frac{1}{20}*\frac{19}{20}*\frac{19}{20}*\frac{19}{20}*\frac{19}{20}*\frac{19}{20}*\frac{19}{20}*\frac{1}{20} = \frac{19^6}{20^8}.$$

S340. The network device determines, based on the state chain probability value of the first Markov chain and a first benchmark probability value, whether the plurality of login sessions are a brute force attack, where the first benchmark probability value is used to identify the brute force attack.

Before S340 is performed, the network device may store the first benchmark probability value.

In an implementation, the determining, by the network device, based on the state chain probability value of the first Markov chain and a first benchmark probability value, whether the plurality of login sessions are a brute force attack may include comparing, by the network device, the state chain probability value of the first Markov chain with the first benchmark probability value, and if the state chain probability value of the first Markov chain is less than or equal to the first benchmark probability value, determining, by the network device, that the plurality of login sessions are the brute force attack.

For example, if the first benchmark probability value stored in the network device is $$\frac{19^5}{20^6},$$

because the state chain probability value of the first Markov chain, $$\frac{19^6}{20^8},$$

in the example shown in FIG. 4 is less than $$\frac{19^5}{20^6},$$

the network device may determine that the eight login sessions included in FIG. 4 are a brute force attack.

If a memory 142 of the network device stores a plurality of different first benchmark probability values, the network device may sequentially compare the state chain probability value of the first Markov chain with the plurality of first benchmark probability values. Provided that the state chain probability value of the first Markov chain is less than or equal to any one of the plurality of first benchmark probability values, the network device may determine that the plurality of login sessions are the brute force attack.

In another implementation, the determining, by the network device, based on the state chain probability value of the first Markov chain and a first benchmark probability value, whether the plurality of login sessions are a brute force attack may include subtracting, by the network device, the state chain probability value of the first Markov chain from the first benchmark probability value, to obtain a difference between the state chain probability value of the first Markov chain and the first benchmark probability value, and if the difference is less than or equal to a preconfigured threshold, determining, by the network device, that the plurality of login sessions are the brute force attack.

If the memory 142 of the network device stores a plurality of different first benchmark probability values, the network device may separately subtract the state chain probability value of the first Markov chain from the plurality of first benchmark probability values. Provided that any difference obtained through subtraction is less than or equal to the preconfigured threshold, the network device may determine that the plurality of login sessions are the brute force attack.

Optionally, the initial probability value and the transition probability value used to calculate the state chain probability value of the first Markov chain in S330 may be preset manually, or may be obtained by the network device based on historical mirrored traffic between the client 130 and the server 110.

Figure 5:
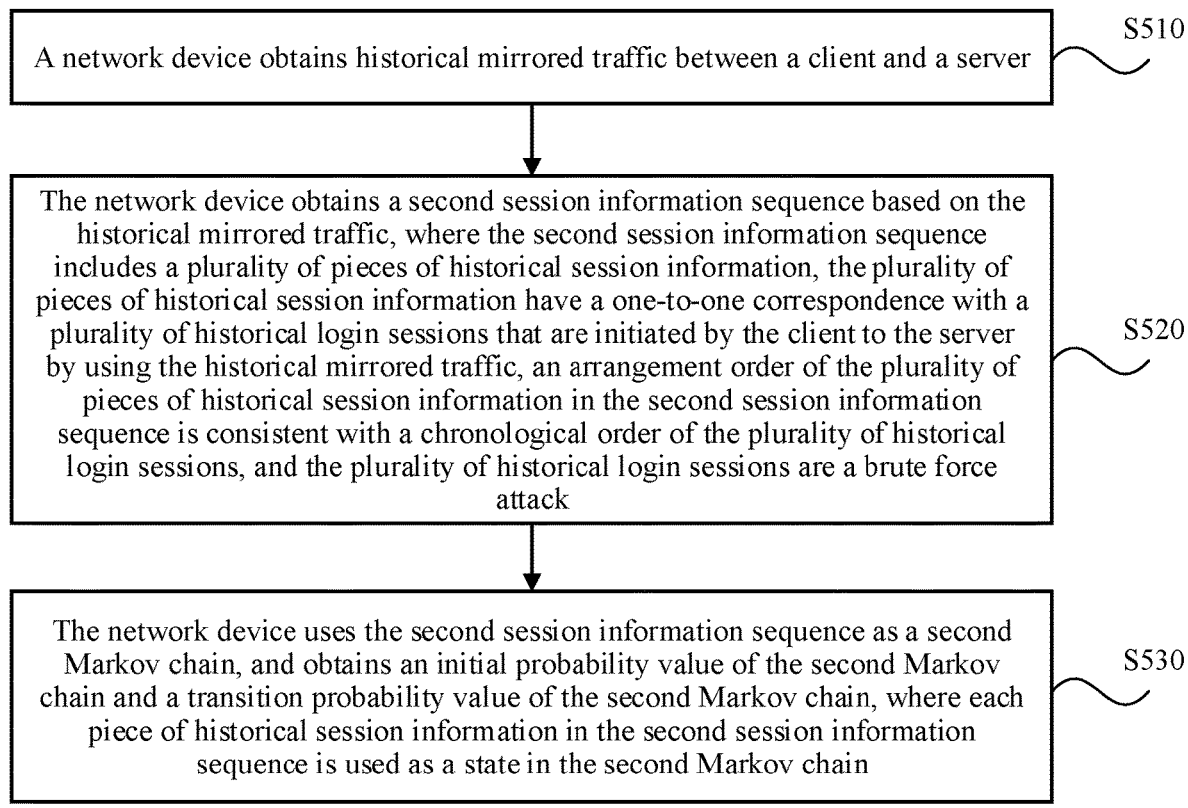
FIG. 5 is a schematic flowchart of a detection method according to an embodiment of this application.

FIG. 5 is a schematic flowchart of a method for obtaining an initial probability value and a transition probability value by a network device based on historical mirrored traffic. It should be understood that FIG. 5 shows steps or operations of the method. However, these steps or operations are merely used as an example. In this embodiment of this application, other operations or variants of the operations in FIG. 5 may alternatively be performed.

The method shown in FIG. 5 may include S510, S520, and S530. The method may be performed by a network device 140.

S510. The network device obtains historical mirrored traffic between a client and a server. The historical mirrored traffic is mirrored traffic generated before S310.

For an implementation of obtaining the historical mirrored traffic by the network device, refer to S310. Details are not described herein again.

S520. The network device obtains a second session information sequence based on the historical mirrored traffic, where the second session information sequence includes a plurality of pieces of historical session information, the plurality of pieces of historical session information have a one-to-one correspondence with a plurality of historical login sessions that are initiated by the client to the server using the historical mirrored traffic, and an arrangement order of the plurality of pieces of historical session information in the second session information sequence is consistent with a chronological order of the plurality of historical login sessions. After manual analysis, it is determined that the plurality of historical login sessions are a brute force attack. The historical mirrored traffic herein may also be considered as sample traffic of the brute force attack after manual calibration.

The historical login session is a login session that is initiated by the client 130 to the server 110 before S310. The historical session information indicates session information of the historical login session.

Because the historical mirrored traffic is generated before S310, a login session initiated to the server using the historical mirrored traffic is the historical login session, and session information obtained from the historical mirrored traffic is the historical session information.

For an implementation of obtaining the second session information sequence by the network device, refer to S320. Details are not described herein again.

For example, three groups of historical mirrored traffic are respectively shown in FIG. 6, FIG. 7, and FIG. 8. The network device may obtain three second session information sequences according to the implementation described in S320. The three second session information sequences have a one-to-one correspondence with FIG. 6, FIG. 7, and FIG. 8.

An attacker initiates seven login sessions using the mirrored traffic shown in FIG. 6, initiates six login sessions using the mirrored traffic shown in FIG. 7, and initiates seven login sessions using the mirrored traffic shown in FIG. 8.

A second session information sequence including seven pieces of session information of the seven login sessions corresponding to FIG. 6 is 184-184-184-184-184-184-184. A second session information sequence including six pieces of session information of the six login sessions corresponding to FIG. 7 is 184-184-184-184-184-184. A second session information sequence including seven pieces of session information of the seven login sessions corresponding to FIG. 8 is 184-184-184-184-184-184-136.

S530. The network device uses the second session information sequence as a second Markov chain, and obtains an initial probability value of the second Markov chain and a transition probability value of the second Markov chain, where each piece of historical session information in the second session information sequence is used as a state in the second Markov chain.

An implementation of obtaining the transition probability value of the second Markov chain by the network device is as follows.

Assuming that state space of all second Markov chains includes n states in total, n*n state transition probability values may be obtained based on all the second Markov chains. A state transition value matrix P formed by the n*n state transition probability values is expressed as $$P = \begin{bmatrix} p_{11}, & \ldots, & p_{1n} \\ \ldots, & p_{ij}, & \ldots \\ p_{n1}, & \ldots, & p_{nn} \end{bmatrix},$$

where $p_{ij}$ represents a transition probability of transition from an $i^{th}$ state to a $j^{th}$ state in the n states, where i and j are positive integers less than or equal to n.

$p_{ij}$ can be calculated using the following formula $$p_{ij} = \frac{p_2 + x}{p_1},$$

where $p_2$ represents a total quantity of times of transition from an $s^{th}$ state to a $t^{th}$ state in all the second Markov chains, $p_1$ represents a total quantity of states in all the second Markov chains, and x represents a quantity of second Markov chains in which the $t^{th}$ state is used as an initial state in all the second Markov chains.

The network device may obtain an initial probability value of each state in all the second Markov chains using a formula $$\frac{1}{n}.$$

For example, when the second session information sequences "184-184-184-184-184-184-184", "184-184-184-184-184-184", and "184-184-184-184-184-184-136" corresponding to FIG. 6, FIG. 7, and FIG. 8 are used as three second Markov chains, in the three second Markov chains, there are two types of states and 20 states in total. Therefore, according to the foregoing formula, it may be calculated that initial probability values of both "184" and "136" are ½₀.

In the three second Markov chains, three second Markov chains use "184" as an initial state, a total quantity of states is 20, and a quantity of times of transition from "184" to "184" is 16. Therefore, according to the foregoing formula, it may be calculated that a probability value of transition from "184" to "184" is $$\frac{16+3}{20} = \frac{19}{20}.$$

Similarly, it may be calculated that a probability value of transition from "184" to "136" is $$\frac{1+0}{20} = \frac{1}{20},$$

a probability value of transition from "136" to "184" is $$\frac{0+0}{20} = 0,$$

and a probability value of transition from "136" to "136" is $$\frac{0+0}{20}=0.$$

That is, when the state space of the second Markov chain includes "184" and "136", the state transition value matrix P of the second Markov chain is $$P = \begin{bmatrix} \frac{19}{20}, \frac{1}{20} \\ 0, 0 \end{bmatrix}.$$

After obtaining the initial probability value and a state transition value of the second Markov chain, the network device may obtain an initial probability value and a state transition value of a first Markov chain based on the initial probability value and the state transition value. For example, the initial probability value of the second Markov chain may be used as the initial probability value of the first Markov chain, and the transition probability value of the second Markov chain may be used as a transition probability value of the first Markov chain.

In a possible implementation, the first benchmark probability value used in S340 may be determined based on a state chain probability value of the second Markov chain.

Figure 9:
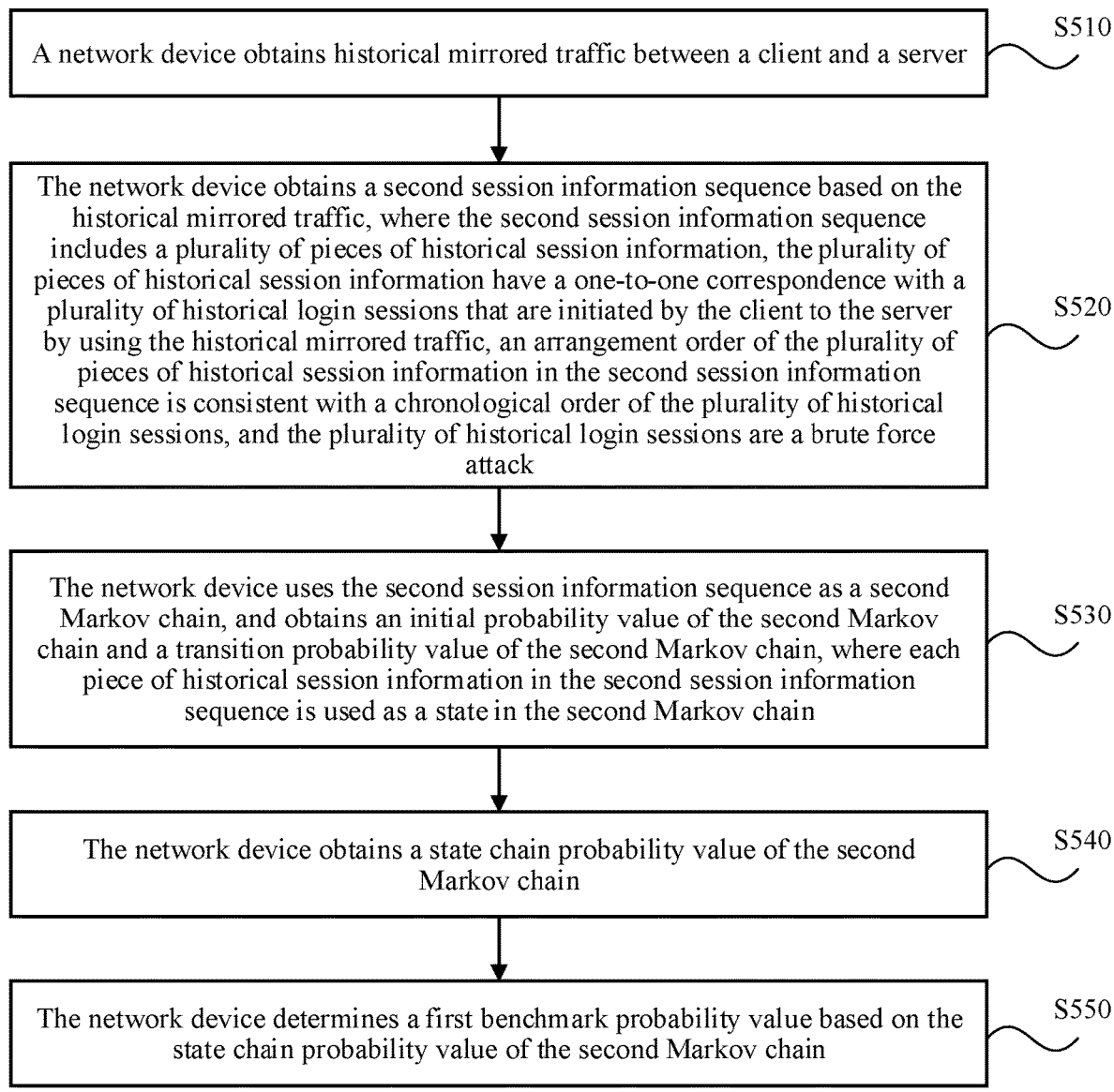
FIG. 9 is a schematic flowchart of a detection method according to an embodiment of this application.

As shown in FIG. 9, after S530, the network device may further perform S540 and S550.

S540. The network device obtains the state chain probability value of the second Markov chain.

S550. The network device determines the first benchmark probability value based on the state chain probability value of the second Markov chain.

For example, if only one second Markov chain is obtained in S530, a state chain probability value of the second Markov chain may be used as the first benchmark probability value.

In an optional manner, if a plurality of second Markov chains are obtained in S530, a largest state chain probability value of state chain probability values of the plurality of second Markov chains may be used as the first benchmark probability value.

For example, the second session information sequence "184-184-184-184-184-184-184" corresponding to FIG. 6 is used as a second Markov chain, and a state chain probability value of the second Markov chain is $$\frac{1}{20}*\frac{19}{20}*\frac{19}{20}*\frac{19}{20}*\frac{19}{20}*\frac{19}{20}*\frac{19}{20}=\frac{19^6}{20^7}.$$

The second session information sequence "184-184-184-184-184-184" corresponding to FIG. 7 is used as a second Markov chain, and a state chain probability value of the second Markov chain is $$\frac{1}{20}*\frac{19}{20}*\frac{19}{20}*\frac{19}{20}*\frac{19}{20}*\frac{19}{20}=\frac{19^5}{20^6}.$$

The second session information sequence "184-184-184-184-184-184-136" corresponding to FIG. 8 is used as a second Markov chain, and a state chain probability value of the second Markov chain is $$\frac{1}{20}*\frac{19}{20}*\frac{19}{20}*\frac{19}{20}*\frac{19}{20}*\frac{19}{20}*\frac{1}{20}=\frac{19^5}{20^7}.$$

Finally, the largest state chain probability value $$\frac{19^5}{20^6} \text{ of } \frac{19^6}{20^7}, \frac{19^5}{20^6}, \text{ and } \frac{19^5}{20^7}$$

is used as the first benchmark probability value.

In another optional manner, when a plurality of second Markov chains are obtained in S530, state chain probability values of the plurality of second Markov chains each may be used as the first benchmark probability value. For example, $$\frac{19^6}{20^7}, \frac{19^5}{20^6}, \text{ and } \frac{19^5}{20^7}$$

may be used as three first benchmark probability values.

Figure 10:
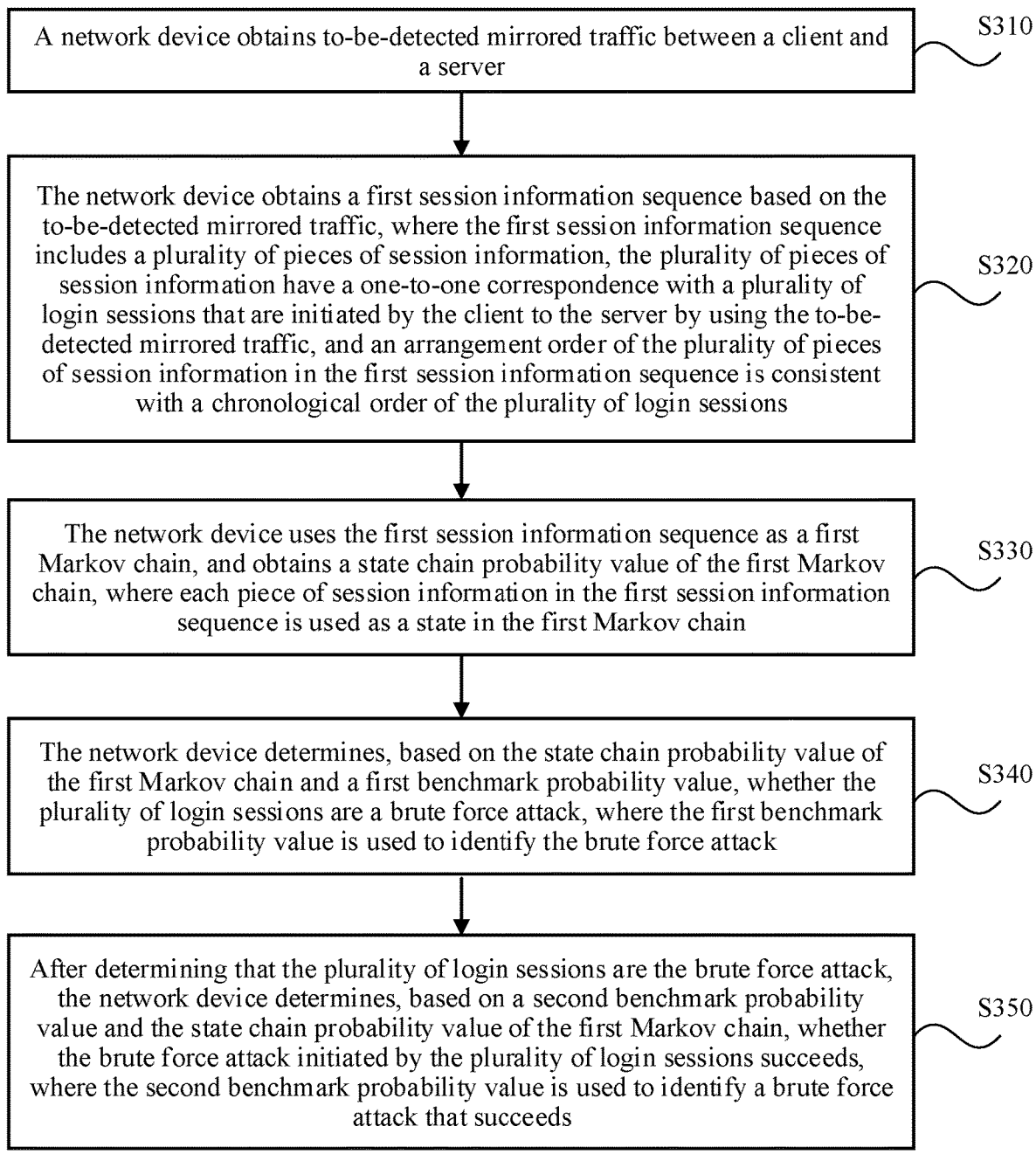
FIG. 10 is a schematic flowchart of a detection method according to an embodiment of this application.

In the detection method in this embodiment of this application, as shown in FIG. 10, S350 may further be included after S340.

S350. After determining that the plurality of login sessions are the brute force attack, the network device determines, based on a second benchmark probability value and the state chain probability value of the first Markov chain, whether the brute force attack initiated by the plurality of login sessions succeeds, where the second benchmark probability value is used to identify a brute force attack that succeeds.

In a possible implementation, the second benchmark probability value may be determined by the network device based on the historical mirrored traffic before S350.

For example, the network device may obtain a third session information sequence from the historical mirrored traffic, where the third session information sequence includes a plurality of pieces of historical session information, the plurality of pieces of historical session information included in the third session information sequence have a one-to-one correspondence with a plurality of historical login sessions between the client and the server, and an arrangement order of the plurality of pieces of historical session information included in the third session information sequence in the third session information sequence is consistent with a chronological order of the plurality of historical login sessions corresponding to the plurality of pieces of historical session information included in the third session information sequence. After manual analysis, it is determined that the plurality of historical login sessions corresponding to the plurality of pieces of historical session information included in the third session information sequence are a brute force attack that succeeds. The historical mirrored traffic herein may also be considered as sample traffic of the brute force attack that succeeds, after manual calibration.

The network device may use the third session information sequence as a third Markov chain, and determine the second benchmark probability value based on a state chain probability value of the third Markov chain. Each piece of historical session information in the third session information sequence is used as a state in the third Markov chain.

The third session information sequence and the second session information sequence may be a same sequence. For example, when the brute force attack initiated by the plurality of historical login sessions corresponding to the second session information sequence succeeds, the second session information sequence may be used as the third session information sequence.

For example, a plurality of historical login sessions initiated using the mirrored traffic shown in FIG. 8 are a brute force attack that succeeds. Therefore, the second session information sequence corresponding to FIG. 8 may be used as the third session information sequence, that is, the state chain probability value $$\frac{19^5}{20^7}$$

of the second Markov chain "184-184-184-184-184-184-136" corresponding to FIG. 8 may be used as the second benchmark probability value.

When the network device determines, based on the second benchmark probability value and the state chain probability value of the first Markov chain, whether the brute force attack initiated by the plurality of login sessions succeeds, in a possible implementation, if the network device determines that the state chain probability value of the first Markov chain is less than or equal to the second benchmark probability value, it is determined that the brute force attack initiated by the plurality of login sessions already succeeds.

For example, in S340, after the network device determines that the plurality of login sessions are the brute force attack, because the state chain probability value $$\frac{19^6}{20^8}$$

of the first Markov chain corresponding to the plurality of login sessions is less than the second benchmark probability value $$\frac{19^5}{20^7},$$

the network device may determine that the brute force attack initiated by the plurality of login sessions already succeeds.

In another possible implementation, if the network device determines that a difference between the state chain probability value of the first Markov chain and the second benchmark probability value is less than or equal to a preconfigured threshold, the network device determines that the brute force attack initiated by the plurality of login sessions already succeeds.

It should be noted that, in this embodiment of this application, session information of a successful login session should be different from session information of a failed login session. For example, in FIG. 4 and FIG. 6 to FIG. 8, session information of a failed login session is 184, and session information of a successful login session is 136.

In the foregoing embodiment, S310 in FIG. 3 or FIG. 10 and S510 in FIG. 5 or FIG. 9 may be further performed by the communications interface 143 of the network device in FIG. 2, S320 to S350 in FIG. 3 or FIG. 10 and S520 to S550 in FIG. 5 or FIG. 9 may be further performed by the processor 141 of the network device in FIG. 2.

Source addresses of the historical login sessions in FIG. 6 to FIG. 8 are the same as source addresses of the login sessions in FIG. 4, destination addresses of the historical login session in FIG. 6 to FIG. 8 are the same as destination addresses of the login sessions in the embodiment of FIG. 4, destination ports of the historical login sessions in FIG. 6 to FIG. 8 are the same as destination ports of the login sessions in FIG. 4, and authentication protocols of the historical login sessions in FIG. 6 to FIG. 8 are the same as authentication protocols of the login sessions in FIG. 4. It should be understood that this is merely an embodiment. This is not limited in the embodiments of this application. For example, a source address, a destination address, a source port, a destination port, and an authentication protocol of a historical login session may be completely or partially different from a source address, a destination address, a source port, a destination port, and an authentication protocol of a to-be-detected login session.

Figure 11:
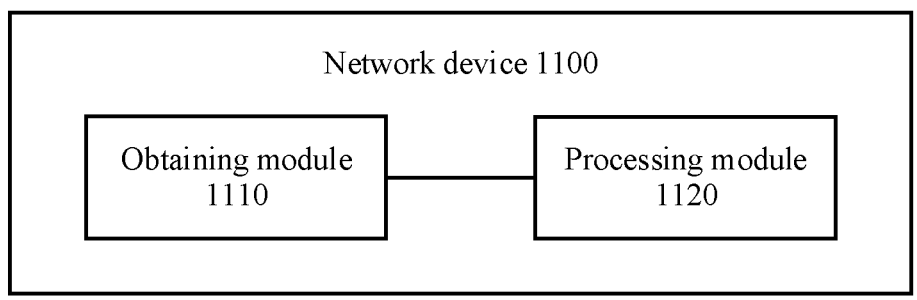
FIG. 11 is a schematic structural diagram of a network device according to an embodiment of this application.

FIG. 11 is a schematic structural diagram of a network device according to an embodiment of this application. It should be understood that a network device 1100 shown in FIG. 11 is merely an example. The network device in this embodiment of this application may further include another module or unit, or include modules having functions similar to those of the modules in FIG. 11, or does not need to include all the modules in FIG. 11.

The network device 1100 shown in FIG. 11 may include an obtaining module 1110 and a processing module 1120.

The network device 1100 may be configured to perform the steps performed by the network device 140 in the detection method shown in any one of FIG. 3, FIG. 5, FIG. 9, and FIG. 10.

For example, the obtaining module 1110 may be configured to perform S310 in FIG. 3 or FIG. 10, S510 in FIG. 5 or FIG. 9, and the processing module 1120 may be configured to perform S320 to S350 in FIG. 3 or FIG. 10, and S520 to S550 in FIG. 5 or FIG. 9.

A person of ordinary skill in the art may be aware that units and algorithm steps in the examples described with reference to the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that for the purpose of convenient and brief description, for a detailed working process of the described system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented using some interfaces. The indirect couplings or communication connections between the apparatuses or units may be implemented in electrical, mechanical, or another form.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to other approaches, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a Universal Serial Bus (USB) flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A brute force attack detection method, implemented by a network device, wherein the brute force attack detection method comprises:
   obtaining to-be-detected mirrored traffic between a client and a server;
   obtaining a first session information sequence based on the to-be-detected mirrored traffic, wherein the first session information sequence comprises a plurality of pieces of session information that have a one-to-one correspondence with a plurality of login sessions between the client and the server, and wherein an arrangement order of the pieces of session information in the first session information sequence is consistent with a chronological order of the login sessions;
   using the first session information sequence as a first Markov chain;
   obtaining a state chain probability value of the first Markov chain, wherein each of the pieces of session information in the first session information sequence is used as a state in the first Markov chain; and
   determining whether the login sessions are a brute force attack based on the state chain probability value of the first Markov chain and a first benchmark probability value, wherein the first benchmark probability value is used to identify the brute force attack.

2. The brute force attack detection method of claim 1, wherein each piece of session information is a sum of a length of a packet carrying a user name and a password and a length of a packet carrying an authentication result, and wherein the packet carrying the user name and the password and the packet carrying the authentication result are in a login session corresponding to the piece of session information.

3. The brute force attack detection method of claim 1, wherein the determining further comprises determining that the login sessions are the brute force attack when the state chain probability value of the first Markov chain is less than or equal to the first benchmark probability value.

4. The brute force attack detection method of claim 1, wherein the determining further comprises determining that the login sessions are the brute force attack when a difference between the state chain probability value of the first Markov chain and the first benchmark probability value is less than or equal to a preconfigured threshold.

5. The brute force attack detection method of claim 1, further comprising determining the state chain probability value of the first Markov chain based on an initial probability value of the first Markov chain and a transition probability value of the first Markov chain, and wherein before obtaining the to-be-detected mirrored traffic between the client and the server, the brute force attack detection method further comprises:
   obtaining historical mirrored traffic between the client and the server;
   obtaining a second session information sequence based on the historical mirrored traffic, wherein the second session information sequence comprises a plurality of pieces of historical session information that have a one-to-one correspondence with a plurality of historical login sessions from the client to the server, wherein an arrangement order of the pieces of historical session information in the second session information sequence is consistent with a chronological order of the historical login sessions, and wherein the historical login sessions are the brute force attack;
   using the second session information sequence as a second Markov chain;
   obtaining an initial probability value of the second Markov chain and a transition probability value of the second Markov chain, wherein each piece of historical session information in the second session information sequence is used as a state in the second Markov chain; and
   determining that the initial probability value of the first Markov chain is the initial probability value of the second Markov chain and the transition probability value of the first Markov chain is the transition probability value of the second Markov chain.

6. The brute force attack detection method of claim 5, wherein before obtaining the to-be-detected mirrored traffic between the client and the server, the brute force attack detection method further comprises:
   obtaining a state chain probability value of the second Markov chain; and
   determining the first benchmark probability value based on the state chain probability value of the second Markov chain.

7. The brute force attack detection method of claim 1, wherein the brute force attack detection method further comprises determining, based on a second benchmark probability value and the state chain probability value of the first Markov chain, whether the brute force attack initiated by the login sessions succeeds when the login sessions are the brute force attack based on the state chain probability value of the first Markov chain and the first benchmark probability value, and wherein the second benchmark probability value identifies a brute force attack that succeeds.

8. The brute force attack detection method of claim 7, further comprising determining the second benchmark probability value based on a state chain probability value of a third Markov chain when a third session information sequence is used as the third Markov chain, wherein the third session information sequence comprises a plurality of pieces of historical session information that have a one-to-one correspondence with a plurality of historical login sessions between the client and the server, wherein the historical login sessions corresponding to the pieces of historical session information in the third session information sequence are a brute force attack that succeeds, wherein each piece of historical session information in the third session information sequence is a state in the third Markov chain, and wherein an arrangement order of the pieces of historical session information comprised in the third session information sequence in the third session information sequence is consistent with a chronological order of the historical login sessions corresponding to the pieces of historical session information comprised in the third session information sequence.

9. The brute force attack detection method of claim 2, wherein the brute force attack detection method further comprises determining, based on a second benchmark probability value and the state chain probability value of the first Markov chain, whether the brute force attack by the login sessions succeeds when the login sessions are the brute force attack based on the state chain probability value of the first Markov chain and the first benchmark probability value, and wherein the second benchmark probability value identifies a brute force attack that succeeds.

10. The brute force attack detection method of claim 4, wherein the brute force attack detection method further comprises determining, based on a second benchmark probability value and the state chain probability value of the first Markov chain, whether the brute force attack by the login sessions succeeds when the login sessions are the brute force attack based on the state chain probability value of the first Markov chain and the first benchmark probability value, and wherein the second benchmark probability value identifies a brute force attack that succeeds.

11. A network device, comprising:
a receiver configured to obtain to-be-detected mirrored traffic between a client and a server; and
a processor coupled to the receiver and configured to:
obtain a first session information sequence based on the to-be-detected mirrored traffic, wherein the first session information sequence comprises a plurality of pieces of session information that have a one-to-one correspondence with a plurality of login sessions between the client and the server, and wherein an arrangement order of the pieces of session information in the first session information sequence is consistent with a chronological order of the login sessions;
use the first session information sequence as a first Markov chain;
obtain a state chain probability value of the first Markov chain, wherein each of the pieces of session information in the first session information sequence is used as a state in the first Markov chain; and
determine whether the login sessions are a brute force attack based on the state chain probability value of the first Markov chain and a first benchmark probability value, wherein the first benchmark probability value identifies the brute force attack.

12. The network device of claim 11, wherein each piece of session information is a sum of a length of a packet carrying a user name and a password and a length of a packet carrying an authentication result, and wherein the packet carrying the user name and the password and the packet carrying the authentication result are in a login session corresponding to the piece of session information.

13. The network device of claim 11, wherein the processor is further configured to determine that the login sessions are the brute force attack when the state chain probability value of the first Markov chain is less than or equal to the first benchmark probability value.

14. The network device of claim 11, wherein the processor is further configured to determine that the login sessions are the brute force attack when a difference between the state chain probability value of the first Markov chain and the first benchmark probability value is less than or equal to a preconfigured threshold.

15. The network device of claim 11, wherein the state chain probability value of the first Markov chain is based on an initial probability value of the first Markov chain and a transition probability value of the first Markov chain, wherein the receiver is further configured to obtain historical mirrored traffic between the client and the server, and wherein the processor is further configured to:
obtain a second session information sequence based on the historical mirrored traffic, wherein the second session information sequence comprises a plurality of pieces of historical session information that have a one-to-one correspondence with a plurality of historical login sessions between the client and the server wherein an arrangement order of the pieces of historical session information in the second session information sequence is consistent with a chronological order of the historical login sessions, and wherein the historical login sessions are a brute force attack;
use the second session information sequence as a second Markov chain;
obtain an initial probability value of the second Markov chain and a transition probability value of the second Markov chain, wherein each of the pieces of historical session information in the second session information sequence is used as a state in the second Markov chain; and
determine that the initial probability value of the first Markov chain is the initial probability value of the second Markov chain, and the transition probability value of the first Markov chain is the transition probability value of the second Markov chain.

16. The network device of claim 15, wherein before the receiver obtains the to-be-detected mirrored traffic between the client and the server, the receiver is further configured to obtain a state chain probability value of the second Markov chain, and wherein the processor is further configured to determine the first benchmark probability value based on the state chain probability value of the second Markov chain.

17. The network device of claim 11, wherein the processor is further configured to determine, based on a second benchmark probability value and the state chain probability value of the first Markov chain, whether the brute force attack initiated by the login sessions succeeds when the login sessions are the brute force attack based on the state chain probability value of the first Markov chain and the first benchmark probability value, and wherein the second benchmark probability value identifies a brute force attack that succeeds.

18. The network device of claim 17, wherein the second benchmark probability value is based on a state chain probability value of a third Markov chain, wherein a third session information sequence is used as the third Markov chain, wherein the third session information sequence comprises a plurality of pieces of historical session information that have a one-to-one correspondence with a plurality of historical login sessions from the client to the server, wherein the historical login sessions of the pieces of historical session information in the third session information sequence are the brute force attack that succeeds, wherein each of the pieces of historical session information are used as a state in the third Markov chain, and wherein an arrangement order of the pieces of historical session information comprised in the third session information sequence in the third session information sequence is consistent with a chronological order of the historical login sessions corresponding to the plurality of pieces of historical session information comprised in the third session information sequence.

19. The network device of claim 12, wherein the processor is further configured to determine, based on a second benchmark probability value and the state chain probability value of the first Markov chain, whether the brute force attack by the login sessions succeeds when the login sessions are the brute force attack based on the state chain probability value of the first Markov chain and the first benchmark probability value, wherein the second benchmark probability value identifies a brute force attack that succeeds.

20. A computer program product comprising computer-executable instructions for storage on a non-transitory computer-readable medium that, when executed by a processor, cause a network device to:
  obtain to-be-detected mirrored traffic between a client and a server;
  obtain a first session information sequence based on the to-be-detected mirrored traffic, wherein the first session information sequence comprises a plurality of pieces of session information that have a one-to-one correspondence with a plurality of login sessions from the client to the server using the to-be-detected mirrored traffic, and wherein an arrangement order of the pieces of session information in the first session information sequence is consistent with a chronological order of the login sessions;
  use the first session information sequence as a first Markov chain;
  obtain a state chain probability value of the first Markov chain, wherein each of the pieces of session information in the first session information sequence is used as a state in the first Markov chain; and
  determine whether the login sessions are a brute force attack based on the state chain probability value of the first Markov chain and a first benchmark probability value, wherein the first benchmark probability value identities the brute force attack.

* * * * *